(12) United States Patent
Chen et al.

(10) Patent No.: US 7,559,643 B2
(45) Date of Patent: Jul. 14, 2009

(54) FUSIBLE INK-JET RECORDING MATERIALS CONTAINING HOLLOW BEADS AND ULTRAFINE POLYMER PARTICLES

(75) Inventors: Tienteh Chen, San Diego, CA (US); Radha Sen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 10/925,664

(22) Filed: Aug. 25, 2004

(65) Prior Publication Data

US 2006/0045999 A1 Mar. 2, 2006

(51) Int. Cl.
B41J 2/01 (2006.01)
(52) U.S. Cl. .................. 347/105; 347/101; 428/32.1
(58) Field of Classification Search .......... 347/101, 347/105, 100; 428/195, 32.1
See application file for complete search history.

(56) References Cited

U.S. PATENT DOCUMENTS

| | | | |
|---|---|---|---|
| 4,929,590 A * | 5/1990 | Maruta et al. .......... 503/207 |
| 6,039,444 A * | 3/2000 | Mori et al. .......... 347/105 |
| 6,352,805 B1 * | 3/2002 | Taylor et al. .......... 347/105 |
| 6,692,799 B2 * | 2/2004 | Waller, Jr. .......... 428/32.23 |
| 2005/0025912 A1 * | 2/2005 | Takeda .......... 428/32.18 |
| 2005/0174415 A1 * | 8/2005 | Chen .......... 347/105 |
| 2005/0287311 A1 * | 12/2005 | Chen et al. .......... 428/32.34 |

FOREIGN PATENT DOCUMENTS

| | | |
|---|---|---|
| EP | 0 671 282 A | 9/1995 |
| EP | 0 826 823 A | 3/1998 |
| EP | 1 403 089 A | 3/2004 |
| EP | 1 561 592 A | 8/2005 |
| JP | 2002-240412 A | 8/2002 |
| JP | 2004-122782 A | 4/2004 |

* cited by examiner

*Primary Examiner*—Manish S Shah

(57) ABSTRACT

Fusible print media, systems for preparing a fused ink-jet image, and methods of preparing a fused ink-jet image, are provided. One exemplary fusible print medium, among others, includes a substrate and an ink-receiving layer disposed on the substrate. The ink-receiving layer includes a first layer having ultrafine polymer particles and a second layer having hollow beads.

18 Claims, 2 Drawing Sheets

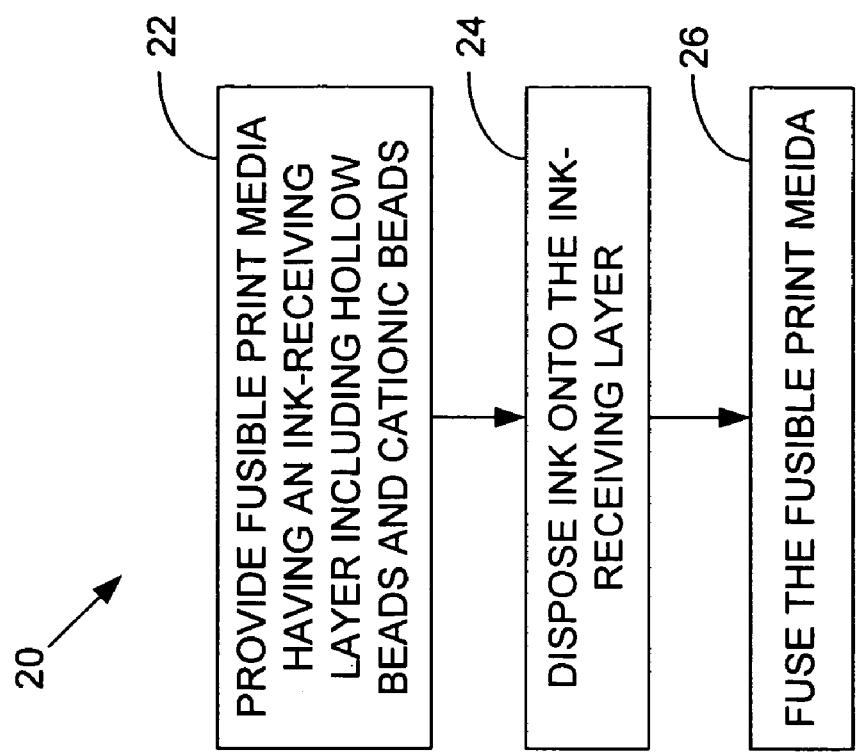

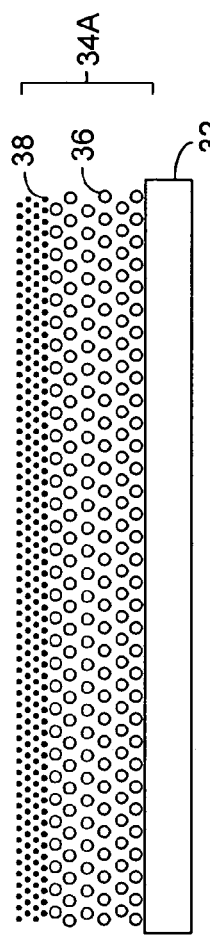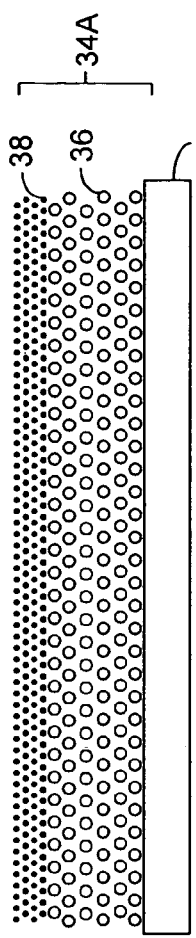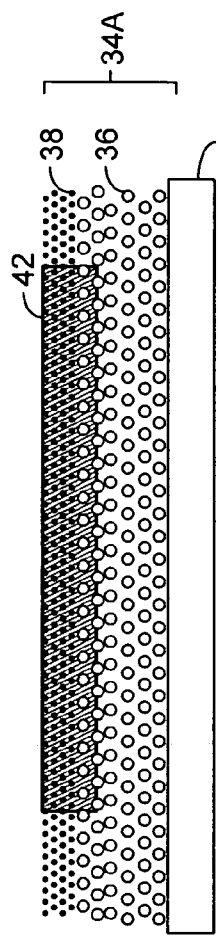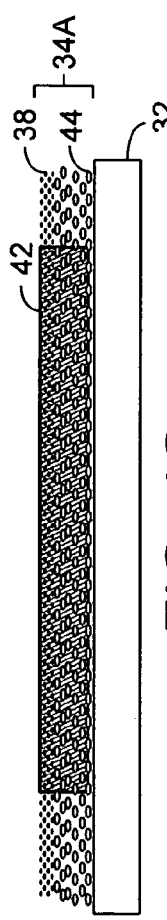

FUSIBLE INK-JET RECORDING MATERIALS CONTAINING HOLLOW BEADS AND ULTRAFINE POLYMER PARTICLES

BACKGROUND

The use of inkjet printing in offices and homes has grown dramatically in recent years. The growth can be attributed to drastic reductions in cost of inkjet printers and substantial improvements in print resolution and overall print quality. While the print quality has improved drastically, research and development efforts continue toward further improving the print quality to achieve images having photographic quality. A photographic quality image includes saturated colors, high gloss and gloss uniformity, freedom of grain and coalescence, and a high degree of permanence. To achieve photographic image quality, the print medium must be fast drying and resist smearing, air, light, and moisture. In addition, the print medium should provide good color fidelity and high image resolution.

In order to obtain printed images that dry quickly and have good image quality, durability, and permanence, microporous inkjet print media with thermally laminated barrier layers have been developed. While lamination of the printed image provides very good image quality and permanence, the cost of producing the laminated images is increased due to the cost of the laminator and the additional supplies that are necessary. In addition, lamination produces haze and air bubbles, which become trapped, decreasing the image quality of the printed images.

Print media that are capable of producing images having photographic image quality are typically categorized into two groups: porous media and swellable media. Porous media generally have an ink-receiving layer that is formed from porous, inorganic particles bound with a polymer binder. An ink-jet ink is absorbed into the pores of the inorganic particles and the colorant is fixed by mordants incorporated in the ink-receiving layer or by the surface of the inorganic particles. Porous media have a short dry time and good resistance to smearing because the inkjet ink is easily absorbed into the pores of the ink-receiving layer. However, porous media do not exhibit good resistance to fade.

In swellable media, the ink-receiving layer is a continuous layer of a swellable, polymer matrix. When the inkjet ink is applied, the inkjet ink is absorbed by swelling of the polymer matrix and the colorant is immobilized inside the continuous layer. Since the colorant is protected from the outside environment, swellable media have greater resistance to light and dark/air fade than the porous media. However, the swellable media generally have reduced smearfastness and a longer drytime than porous media.

SUMMARY

Briefly described, embodiments of this disclosure include fusible print media, systems for preparing a fused ink-jet image, and methods of preparing a fused ink-jet image. One exemplary fusible print medium, among others, includes a substrate and an ink-receiving layer disposed on the substrate. The ink-receiving layer includes a first layer having ultrafine polymer particles and a second layer having hollow beads.

One exemplary system for preparing a fused ink-jet image, among others, includes: a substrate, an ink dispensing system, and a fuser system. The substrate includes an ink-receiving layer disposed on the substrate. The ink-receiving layer includes a first layer having ultrafine polymer particles (and a second layer having hollow beads. The ink dispensing system is configured to print ink onto the fusible print media. The fuser system is configured to fuse the fusible print media after dispensing ink onto the fusible print media.

One exemplary method of preparing a fused ink-jet image, among others, includes: providing a fusible print media, dispensing an ink onto the fusible print media, and fusing the fusible print media after dispensing an ink onto the fusible print media. The fusible print media includes a substrate and an ink-receiving layer disposed on the substrate. The ink-receiving layer includes a first layer having ultrafine polymer particles and a second layer having hollow beads.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIG. 1 illustrates an embodiment of a printer system.

FIG. 2 illustrates a flow diagram of a representative embodiment for using fusible print media having an ink-receiving layer including hollow beads and ultrafine polymer particles.

FIG. 3 illustrates a cross-sectional view of a representative embodiment of fusible print media having an ink-receiving layer including hollow beads and ultrafine polymer particles.

FIGS. 4A through 4C are cross-sectional views of a series of schematic diagrams illustrating the dispensing an ink dye onto the fusible print media shown in FIG. 3 and the fusing of the print media.

DETAILED DESCRIPTION

Fusible print media and systems using fusible print media are described. Embodiments of the present disclosure enhance the gloss, gamut, durability, water fastness, fading (due to air pollutants), and ink absorbtivity relative to currently known media. The fusible print media can include, but is not limited to, a substrate having an ink-receiving layer. The ink-receiving layer can include, but is not limited to, a first layer of ultrafine polymer particles and a second layer of hollow beads. A dye-based ink can be dispensed onto the ink-receiving layer and interacts with the first layer of ultrafine polymer particles. After disposing the dye-based inkjet ink onto the ink-receiving layer, the fusible print media is fused. Upon fusing the fusible print media the hollow beads are substantially compressed (e.g., reducing the void volume of the hollow beads), which fuses the ink within the ink-receiving layer.

FIG. 1 illustrates a block diagram of a representative printer system 10 that includes a computer control system 12, ink dispensing system 14, fuser system 16 and fusible print media 18. The computer control system 12 includes a process control system that is operative to control the ink dispensing system 14 and the fuser system 16. In particular, the computer control system 12 instructs and controls the ink dispensing system 14 to print characters, symbols, photos, and the like, onto the fusible print media 18. In addition, the computer control system 12 instructs and controls the fuser system 16 to fuse the fusible print media 18 after printing.

The ink dispensing system 14 includes, but is not limited to, ink-jet technologies and coating technologies, which dispense the ink onto the fusible print media. Ink-jet technology, such as drop-on-demand and continuous flow ink-jet technologies, can be used to dispense the ink. The ink dispensing system 14 can include at least one ink-jet printhead (e.g., thermal ink-jet printhead and/or a piezo ink-jet print head) operative to dispense (e.g., jet) the inks through one or more of a plurality of ink-jet printhead dispensers.

FIG. 2 is a flow diagram describing a representative method 20 for printing on the fusible print media using the printer system 10. In block 22, the fusible print media having an ink-receiving layer including a first layer of ultrafine polymer particles and a second layer of hollow beads is provided. In block 24, the ink is disposed onto the ink-receiving layer of the fusible print media 18 using the ink dispensing system 14. In block 26, the fusible print media is fused by the fuser system 16 after being printed.

FIG. 3 illustrates a cross-sectional view of a representative embodiment of the fusible print media 30. As mentioned above, the fusible print media 30 can include, but is not limited to, a substrate 32 having ink-receiving layer 34A. The ink-receiving layer 34A can include, but is not limited to, a first layer of ultrafine polymer particles 38 and a second layer of hollow beads 36. In addition, the ink-receiving layer 34A can include a binder (not shown for clarity). The first layer is from about 0.5 to 10 and from about 1 to 5 grams per square meter (GSM). The second layer is from about 10 to 50 GSM and from about 20 to 40 GSM.

The term "substrate" 32 refers to fusible print media substrates that can be coated with the ink-receiving layer 34A in accordance with embodiments of the present disclosure. The substrate 32 can include, but is not limited to, paper media, photobase media, plastic media such as clear to opaque plastic film, and the like. The substrate 32 may include, but is not limited to, a hard or flexible material made from a polymer, a paper, a glass, a ceramic, a woven cloth, or a non-woven cloth material. The substrate 32 may be from about 2 mm to about 12 mm thick, depending on a desired end application for the fusible print media 30.

The term "ink-receiving layer" 34A refers to compositions that include the first layer of ultrafine polymer particles 38 and the second layer hollow beads 36 that can be disposed (e.g., coated) on the fusible print media substrate 32. The first layer is disposed on the second layer, while the second layer is disposed on the substrate 32. The ink-receiving layer 34A is configured to receive ink, at least in part, by interactions between the ink and the ultrafine polymer particles 38. In addition, the ink is received within the pores provided by the hollow beads 36, and by the space between hollow beads 36.

The ink-receiving layer 34A also includes binder material used to bind the ultrafine polymer particles 38 and/or the hollow beads 36 together. The binder materials can include, but are not limited to, water soluble polymers (e.g., polyvinyl alcohol, cationic polyvinylalcohol, acetoacetylated polyvinylalcohol, silylated polyvinylalcohol, carboxylated polyvinylalcohol, polyvinylpyrrolidone, copolymer of polyvinylacetate and polyvinylpyrrolidone, copolymer of polyvinylalcohol and polyvinylpyrrolidone, cationic polyvinylpyrrolidone, gelain, hydroxyethylcellulose, methyl cellulose), water dispersible polymers, gelatin, and/or low glass transition temperature (Tg<20° C.) emulsion polymers (e.g., styrene butadiene particle, styrene acrylic particle, vinyl acrylic particle, all acrylic particle, polyurethane dispersions, and polyester dispersions).

An amount of binder can be used that functionally binds together the ultrafine polymer particles 38 and/or the hollow beads 36, but still leaves space between and within the ultrafine polymer particles 38 and/or hollow beads 36 such that ink can be received within the ink receiving layer 34A upon printing. Appropriate ratios can provide ink-receiving layers 34A that avoid unwanted cracking upon drying, and at the same time, provide ultrafine polymer particles 38 and/or hollow beads 36 adhesion within the ink-receiving layer while maintaining voids within and around the ultrafine polymer particles 38 and/or the hollow beads 36. For example, the ink-receiving layer 34A can include greater than about 70% hollow beads 36 and about 1 to 20% of ultrafine polymer particles. The ink-receiving layer 34A can be from about 10 to 50 grams per square meter (GSM) and from 10 to 30 GSM. The first layer is from about 0.2 to 10 GSM, while the second layer is from 5 to 50 GSM.

The ultrafine polymer particles 38 chemically interacts (e.g., ionically bonds) with the dye-based ink. The ultrafine polymer particles 38 can be cationic or anionic. In one embodiment, cationic beads are used and ionically bond with anionic dye-based ink. The ultrafine polymer particles 38 can include, but are not limited to, cationic polymeric particle having about 50 to 99% of hydrophobic addition monomers and about 1 to 50% of cationic addition monomers (e.g., salts of primary, secondary, and tertiary amines or quaternary ammonium functional groups). Examples of hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylica containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), $C_1$-$C_{12}$ alkyl acrylamide and methacrylamide (e.g., t-butyl acrylamide, sec-butyl acrylamide, N,N-dimethylacrylamide), crosslinking monomers(e.g., divinyl benzene, ethyleneglycoldimethacrylate, bis(acryloylamido) methylene), and combinations thereof. In particular, the are alkyl acrylate, alkyl methacrylate, vinyl esters, and styrene derivatives.

Examples of monomers containing amine or quaternary ammonium functional groups include, but are not limited to, N-(2-aminoethyl) methacrylamide, N-(2-aminoethyl) acrylamide, N-(3-aminopropyl) methacrylamide, N-(3-aminopropyl)acrylamide, p-vinylbenzylamine, m-vinylbenzylamine, methylaminoethyl methacrylate, ethylaminoethyl methacrylate, n-propylaminoethyl methacrylate, isopropylaminoethyl methacrylate, n-butylaminoethyl methacrylate, sec-butylaminoethyl methacrylate, isobutylaminoethyl methacrylate, tert-butylaminoethyl methacrylate, methylaminoethyl acrylate, ethylaminoethyl acrylate, n-propylaminoethyl acrylate, isopropylaminoethyl acrylate, n-butylaminoethyl acrylate, sec-butylaminoethyl acrylate, isobutylaminoethyl acrylate, tert-butylaminoethyl acrylate, methylaminopropyl methacrylate, ethylaminopropyl methacrylate, n-propylaminopropyl methacrylate, isopropylaminopropyl methacrylate, n-butylaminopropyl methacrylate, sec-butylaminopropyl methacrylate, isobutylaminopropyl methacrylate, tert-butylaminopropyl methacrylate, methylaminopropyl acrylate, ethylaminopropyl acrylate, n-propylaminpropyl acrylate, isopropylaminopropyl acrylate, n-butylaminopropyl acrylate, sec-butylaminopropyl acrylate, isobutylaminopropyl acrylate, tert-butylaminopropyl acrylate, N-(methbylaminoethyl) methacrylamide, N-(ethylaminoethyl) methacrylamide, N-methyl-N-(p-vinylbenzyl) amine, N-methyl-N-(m-vinylbenzyl)amine, N-ethyl-N-(p- vinylbenzyl)amine, N-ethyl-N-(m-vinylbenzyl)amine, dimethylaminoethyl methacrylate, diethylaminoethyl methacrylate, dimethylaminoethyl acrylate, diethylaminoethyl acrylate, dimethylaminopropyl methacrylate, diethylaminopropyl methacrylate, N-(dimethylaminoethyl) methacrylamide, N-(diethylaminoethyl) methacrylamide, N-(dimethylaminoethyl) acrylamide, N-(diethylaminoethyl) acrylamide, N-(dimethylaminopropyl) methacrylamide, N-(diethylaminopropyl) methacrylamide, N-(dimethylaminopropyl) acrylamide, N-(diethylaminopropyl) acrylamide, N-ethyl-N-methylaminoethyl methacrylate, N-ethyl-N-methylaminopropyl acrylate, N,N-dimethyl-N-(p-vinylbenzyl)amine, N,N-dimethyl-N-(m-vinylbenzyl)amine, N,N-diethyl-N-(p-vinylbenzyl)amine, N,N-diethyl-N-(m-vinylbenzyl)amine, N-ethyl-N-methyl-N-(p-vinylbenzyl)amine, and combinations thereof. In addition, the amines include the quaternary salts derived from these amine monomers such as, but not limited to, 4-vinylbenzyltrimethylammoniumchloride, methyl-2-(methacryloyloxy) ethylammonium salt, ethyl-2-(methacryloyloxy) ethylammonium salt, n-propyl-2-(methacryloyloxy)ethylammonium salt, 2-(methacryloylamino)ethylammoniumchloride salt, 2-(acryloylamino) ethylammoniumachloride salt, 3-(methacryloylamino)propyl ammoniumchloride salt, methyl-p-vinylbenzylammonium salt, methyl-m-vinylbenzylammonium salt, ethyl-p-vinylbenzylammonium salt, ethyl-m-vinylbenzylammonium salt, trimethyl-2-(methacryloyloxy)ethylammonium salt, triethyl-2-(methacryloyloxy)ethylammonium salt, trimethyl-2-(acryloyloxy) ethylammonium salt, and triethyl-2-(acryloyloxy)ethylammonium salt. Examples of ultrafine cationic particle are TruDot P-2604, P-2606, P-2608, P-2610, P-2630, and P-2850 (available from Mead-Westvaco Corp. (Stamford, Conn.)) and Rhoplex® Primal-26 (available from Rohm and Haas Co. (Philadelphia, Pa.)).

In another embodiment, the ultrafine anionic particle will be used with cationic dyes. The anioic polymeric particle includes, but is not limited to, about 50 to 99% of hydrophobic addition monomers and about 1 to 50% of anionic addition monomers. The hydrophobic monomers are similar to those described above. The anionic monomers are monomers containing anionic functional group, such as, but not limited to, sulfonic acid, sulfuric acid, phosphoric acid, carboxylic acid, sulfinic acid, and combinations thereof. Examples of anionic monomers are free acids and metal salts of styrene sulfonic acid, 2-sulfoethylmethacrylate, 3-sulfopropylmethacrylate, 4-sulfobutylmethacrylate, 2-acrylamido-2-methyl-1-propanesulfonic acid (AMPS), acryloxypropylphosphoric acid, acryloxyethylsulfonic acid, acrylic acid, methacrylic acid, and combinations thereof. The commercial anionic polymer particles include, but are not limited to, Rhoplex, The particle size of the ultrafine polymer particles can be from about 0.05 to 0.5 μm and from about 0.05 to 0.2 μm. The glass transition temperature (Tg) of the ultrafine polymer particle is from about 20 to 120° C. and from about 30 to 100° C.

The term "hollow bead" 36 refers to hollow plastic pigments and the like, that include one or more void(s) within the outer dimension of the pigment volume. The hollow beads 36 can have a void volume from 20% to 70% and 30% to 60%. In addition, the hollow beads 36 can have a diameter from about 0.3 to 10 μm, about 0.3 to 5 μm, and about 0.3 to 2 μm. Further, the hollow beads 36 can have a glass transition temperature (Tg) above about 50° C., above about 70° C., above about 90° C., from about 50° C. to 120° C., from about 50° C. to 120° C., from about 70° C. to 120° C., and from about 90° C. to 120° C. Furthermore, the hollow beads 36 used for a particular application have substantially the same diameter.

The hollow beads 36 can be derived from chemicals such as, but are not limited to, acid monomers, non-ionic monoethylenically unsaturated monomers, and polyethylenically unsaturated monomer. The acid monomers can include, but are not limited to, acrylic acid, methacrylic acid, and mixtures thereof; and acryloxypropionic acid, methacryloxypropionic acid, acryloxyacetic acid, methacryloxyacetic acid, and monomethyl acid itaconate. The noionic monoethylenically unsaturated monomers can include, but are not limited to, styrene and styrene derivatives (e.g. alkyl, chloro- and bromo- containing styrene), vinyltoluene, ethylene, vinyl esters (e.g. vinyl acetate, vinylformate, vinylacetate, vinylpropionate, vinylbenzoate, vinylpivalate, vinyl 2-ethylhexanoate, vinyl methacrylate, vinyl neodecanoate, and vinyl neononanoate), vinyl versatate, vinyl laurate, vinyl stearate, vinyl myristate, vinyl butyrate, vinyl valerate, vinyl chloride, vinylidene chloride, acrylonitrile, methacrylonitrile, acrylamide, (meth)acrylamide, t-butylacrylamide, t-butyl methacrylamide, isopropylarylamide, isopropylmethacrylamide, and $C_1$-$C_{20}$ alkyl or $C_3$-$C_{20}$ alkenyl esters of (meth)acrylic acid.

The expression (meth)acrylic acid is intended to serve as a generic expression embracing both acrylic acid and methacrylic acid (e.g., methyl methacrylate, t-butylmethacrylate, methyl acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate, hydroxyl containing (meth)acrylate, (e.g., hydroxyethylacrylate, hydroxyethylmethacrylate, hydroxypropylacrylate, hydroxypropylmethacrylate, and 2,3-Dihydroxypropyl methacrylate)). Polyethylenically unsaturated monomers can include, but are not limited to, ethylene glycol di(meth)acrylate, allyl (meth)acrylate, 1,3-butane-diol di(meth)acrylate, diethylene glycol di(meth)acrylate, trimethylol propane trimethacrylate, and divinyl benzene.

In particular, the hollow beads 36 can include, but are not limited to, an acrylic or styrene acrylic emulsion, such as Ropaque® HP-543, Ropaque® HP-643, Ropaque® HP-1055, or Ropaque® OP-96 (available from Rohm and Haas Co. (Philadelphia, Pa.)) or Dow HS 2000NA, Dow 3000NA, Dow 3020NA, or Dow 3042NA (available from Dow Chemical Co. (Midland, Mich.)).

The term "fuse," "fusion," "fusing," or the like, refers to the state of a printed character, symbol, and/or image (or the process of obtaining a printed image) that has been at least partially melted such that the ink-receiving layer 34A forms a film that protects the ink printed therein or thereon. Fusion can occur by applying heat and/or pressure, and preferably both, to the fusible print media after being printed. Due to the application of heat, and optionally, pressure, the ink-receiving layer becomes compressed and fused. The amount of heat and/or pressure applied is material dependent, but generally, can be from 100° C. to 250° C. and/or from 50 pounds per square ink (psi) to 300 psi, respectively.

FIGS. 4A through 4C are cross-sectional views of a series of schematic diagrams illustrating dispensing a dye-based ink 42 onto the fusible print media 30 shown in FIG. 3 and the fusing of the fusible print media 30. FIG. 4A illustrates the fusible print media 30, while FIG. 4B illustrates dye-based ink 42 disposed upon the ink-receiving layer 34A by the ink dispenser system 14. The ink 42 interacts (e.g., through ionic interactions) with the ultrafine polymer particles 38 of the first layer of the ink-receiving layer 34A. FIG. 4C illustrates the fusing of the fusible print media 30. The ink-receiving layer 34B has been compressed (e.g., compressed hollow beads 44) due to the heat and/or pressure applied by the fuser system 16. The compressed ink-receiving layer 34B protects the dye-based ink 42 printed onto the fusible print media 30.

In some embodiments the ink-receiving layer 34A may include microporous and/or mesoporous inorganic particles having a large surface area. The microporous and/or mesoporous inorganic particles may be bound in a polymer binder to form the ink-receiving layer 34A. The microporous and/or mesoporous inorganic particles may include, but are not limited to, silica, silica-magnesia, silicic acid, sodium silicate, magnesium silicate, calcium silicate, alumina, alumina hydrate, barium sulfate, calcium sulfate, calcium carbonate, magnesium carbonate, magnesium oxide, kaolin, talc, titania, titanium oxide, zinc oxide, tin oxide, zinc carbonate, pseudoboehmite, bentonite, hectorite, clay, and mixtures thereof. The ink-receiving layer 34A may be from approximately 1 μm to approximately 300 μm thick.

In some embodiments the ink-receiving layer 34A may also include non-hollow polymer particles to modify the physical properties of the ink-receiving layer 34A. The composition of the non-hollow polymer particle can be the same as hollow particles except there is no void inside the particles. The morphology of the non-hollow particles can be homogenous or core-shell. The $T_g$ of the non-hollow particles can be from about 0 to 120° C. and preferably from about 50 to 100° C. The particle size of the non-hollow particles can be from about 0.2 to 5 μm and preferably from 0.2 to 1 μm. Most preferred compositions of the non-hollow polymer particles suitable as additives include, but are not limited to, styrene compounds, styrene acrylic compounds, all acrylic compounds, vinylacrylic compounds, and vinylacetate particle compounds.

The dyes that can be used with embodiments of this disclosure include a large number of water-soluble acid and direct dyes. Specific examples of such dyes include the Pro-Jet series of dyes available from Avecia Ltd., including Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like. Further examples include Tricon Acid Red 52, Tricon Direct Red 227, and Tricon Acid Yellow 17 (Tricon Colors Incorporated), Bemacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Direct Blue 86, Mobay Chemical), Reactive Red 4, Aldrich Chemical), Reactive Red 56, Pylam, Inc., Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Direct Yellow 86, Carolina Color and Chemical, Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof; and the like. This list is intended to be merely exemplary, and should not be considered limiting.

Various buffering agents or pH adjusting agents can also be optionally used in the ink compositions of the present disclosure. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink composition.

Various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink composition and often from about 0.1 wt % to about 0.25 wt %.

Surfactants can also be present, such as alkyl polyethylene oxides, alkyl phenyl polyethylene oxides, polyethylene oxide (PEO) block copolymers, acetylenic PEO, PEO esters, PEO amines, PEO amides, and dimethicone copolyols can be used. If used, such surfactants can be present at from about 0.01% to about 10% by weight of the ink composition.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

EXAMPLE 1

Preparation of Cationic Ultrafine Polymer Particle

About 100 grams (g) deionized water, about 1.0 g of cetyl trimethylammoniumbromide were charged to a 1 liter 3-neck round bottom flask equipped with a mechanical stirrer, a nitrogen inlet, and a condenser. The flask was immersed in a constant temperature bath at about 80° C. The system was degassed and filled with nitrogen three times. Monomer mixture including about 500 g deionized water, about 150 g of styrene, about 50 g of n-butyl acrylate, about 20 g of trimethylaminoethylacrylate methylsulfate salts, about 1.1 g of 2,2'-azobis(2-methylpropionamidine)dihydrochloride and about 5.5 g of cetyl trimethylammonium bromide were mixed and emulsified with a homegenizer to obtain a stable monomer emulsion. The monomer emulsion was pumped into the reaction vessel over about two hours. The polymerization was continued for one more hours and the polymer product was cooled to room temperature and filtered. The polymer particle obtained has a particle size of about 120 nm measured by Malvern's Nazo-ZS instrument.

Other ultrafine cationic polymer particles can be prepared by the same way. The composition and their physical properties are shown in Table 1.

TABLE 1

| I.D. | Monomer Composition | Particle Size |
|------|---------------------|---------------|
| CL2  | Styrene (60%) Ethyl Acrylate (30%) Trimethylaminoethylacrylate methylsulfate salts (10%) | 115 nm |
| CL3  | Methylmethacrylate (50%) Ethyl Acrylate (30%) | 118 nm |

TABLE 1-continued

| I.D. | Monomer Composition | Particle Size |
|------|---------------------|---------------|
| CL4  | Trimethylaminoethylacrylate methylsulfate salts (20%) Styrene (50%) n-Butyl Acrylate (30%) | 120 nm |
| CL5  | Trimethylaminoethylacrylate chloride salts (20%) Styrene (50%) n-Butyl Acrylate (30%) | 110 nm |
| CL6  | (3-acrylamidopropyl) trimethyl ammonium chloride (20%) t-Buylacrylamide (50%) n-Butyl Acrylate (30%) (3-acrylamidopropyl) trimethyl ammonium chloride (20%) | 98 nm |
| CL7  | t-Butyl methacrylate (50%) 2-Hydroxyethylacylate (10%) n-Butyl Acrylate (20%) (3-acrylamidopropyl) trimethyl ammonium chloride (20%) | 130 nm |

EXAMPLE 2

Preparation of Inkjet Recording Materials

Fusible inkjet recording materials and comparative examples are shown in Table 2.

TABLE 2

| ID | Top Layer* | Coatweight | Bottom layer** | coatweight | Color Gamut | Gloss (20°) | Magenta OD Loss (4 wks) |
|----|-----------|------------|----------------|------------|-------------|-------------|-------------------------|
| 1  | None |          | Ropaque HP-643P | 30 GSM | 228770 | 25 | 20.6 |
| 2  | None |          | Ropaque HP-543P | 30 GSM | 214500 | 28 | 22   |
| 3  | None |          | Ropaque OP-96   | 30 GSM | 240708 | 25 | 19   |
| 4  | None |          | Dow HS2000NA    | 30 GSM | 237658 | 30 | 23   |
| 5  | None |          | Dow HS3000NA    | 30 GSM | 225699 | 26 | 19   |
| 6  | CL1  | 5 GSM    | Ropaque HP-643P | 30 GSM | 304000 | 56 | 12   |
| 7  | CL1  | 5 GSM    | Ropaque HP-543P | 30 GSM | 312000 | 60 | 11   |
| 8  | CL1  | 5 GSM    | Ropaque OP-96   | 30 GSM | 306900 | 54 | 9    |
| 9  | CL1  | 5 GSM    | Dow HS2000NA    | 30 GSM | 320456 | 66 | 11   |
| 10 | CL1  | 5 GSM    | Dow HS3000NA    | 30 GSM | 330455 | 56 | 10   |

*Typical formulation of top layer is: 100 parts cationic polymer particles, 10 parts of Celvol 523, 0.5 part Curesan 200 and 1 part Triton X-100.
**Typical formulation of bottom layer is 100 parts hollow particle, 10 parts Celvol 523, and 0.5 part Curesan 200.

Procedure:

Particle dispersions in Table 2 were mixed with binders and enough deionized water to adjust their total percent solid to about 20%. The final % solid was adjusted so that the final viscosity of the fluids is within the desirable range for good hand drawdown. The mixture was stirred at ambient temperature with a lab stirrer for about 30 minutes until the mixture was well mixed. The coating fluid obtained was coated on a 9 mils gel-subbed photo based paper with a wired rod (e.g., a Mylar rod) to give desirable coatweight (usually about 30 gram/m$^2$). The coating was carefully dried with a heat fun to prevent the premature fusing of the coating. For the coating used herein, the bottom layer was coated first and dried. The coating was rewetted with a spray bottle, the excess was wiped out, and the top coating formulation was applied again with a Mylar rod and dried again carefully.

A test plot was printed on the dry coating with an Hewlett Packard Deskjet 970 inkjet printer. The printed sample was dried overnight and then passed through a fusing roller (100 PSI, 140° C, 0.1 in/sec) to fuse the printed sample. The color gamut and gloss were measured after the fusing. The air-fade resistance of the print was also measured. The results are shown in Table 2.

Table 2 illustrates that color gamut, gloss, and air-fade resistance of the porous inkjet media improved for the dye based ink if the fusible inkjet materials contains a thin layer of ultrafine polymer particles on the uppermost layer. The cationic ultrafine polymer particles are used for the anionic dye, while anionic ultrafine polymer particles are used for the cationic dye.

Many variations and modifications may be made to the above-described embodiments. All such modifications and variations are intended to be included herein within the scope of this disclosure and protected by the following claims.

At least the following is claimed:

1. A fusible print media, comprising:
a substrate;
an ink-receiving layer disposed on the substrate, wherein the ink-receiving layer includes a first layer having ultrafine polymer particles and a second layer having hollow beads, wherein the first layer is disposed directly upon the second layer, wherein the hollow beads have a diameter from about 0.3 to 10 µmeters, a void volume of about 20% to 70%, and a glass transition temperature above 50°C.

2. The fusible print media of claim 1, wherein the ultrafine polymer particle is a cationic ultrafine polymer particle.

3. The fusible print media of claim 2, wherein the cationic ultrafine polymer particles is composed of about 50 to 99% of hydrophobic addition monomers and about 1 to 50% of cationic addition monomers.

4. The fusible print media of claim 3, wherein hydrophobic addition monomers are selected from $C_1$-$C_{12}$ alkyl acrylate, $C_1$-$C_{12}$ alkyl methacrylate, vinyl esters, styrene, styrene derivatives, and combinations thereof.

5. The fusible print media of claim 3, wherein cationic addition monomers are selected from salts of primary, secondary, and tertiary amines and quaternary ammonium functional groups.

6. The fusible print media of claim 3, wherein cationic addition monomers are selected from salts of 4-vinylbenzytrialkylammonium, salts of trialkylaminoethylacrylate, salts of salts of trialkylaminopropylacrylamides.

7. The fusible print media of claim 1, wherein the ultrafine polymer particle is an anionic ultrafine polymer particle.

8. The fusible print media of claim 7, wherein the anionic ultrafine polymer particles is composed of about 50 to 99% of hydrophobic addition monomers and about 1 to 50% of anionic addition monomers.

9. The fusible print media of claim 8, wherein hydrophobic addition monomers are selected from $C_1$-$C_{12}$ alkyl acrylate, $C_1$-$C_{12}$ alkyl methacrylate, vinyl esters, styrene, styrene derivatives, and combinations thereof.

10. The fusible print media of claim 8, wherein anionic addition monomers include monomers containing anionic functional group, are selected from sulfonic acid, sulfuric acid, phosphoric acid, carboxylic acid, sulfinic acid, and combinations thereof.

11. A fusible print media, comprising:
a substrate;
an ink-receiving layer disposed on the substrate, wherein the ink-receiving layer includes a first layer having ultrafine polymer particles and a second layer having hollow beads, wherein the hollow beads have a diameter from about 0.3 to 10 µmeters, a void volume of about 20% to 70%, and a glass transition temperature above 50°C., and wherein the ultrafine polymer particles are selected from one of a cationic ultrafine polymer particle or an anionic ultrafine polymer particle.

12. The fusible print media of claim 11, wherein the cationic ultrafine polymer particles is composed of about 50 to 99% of hydrophobic addition monomers and about 1 to 50% of cationic addition monomers.

13. The fusible print media of claim 12, wherein hydrophobic addition monomers are selected from $C_1$-$C_{12}$ alkyl acrylate, $C_1$-$C_{12}$ alkyl methacrylate, vinyl esters, styrene, styrene derivatives, and combinations thereof.

14. The fusible print media of claim 12, wherein cationic addition monomers are selected from salts of primary, secondary, and tertiary amines and quaternary ammonium functional groups.

15. The fusible print media of claim 12, wherein cationic addition monomers are selected from salts of 4-vinylbenzytrialkylammonium, salts of trialkylaminoethylacrylate, salts of salts of trialkylaminopropylacrylamides.

16. The fusible print media of claim 11, wherein the anionic ultrafine polymer particles is composed of about 50 to 99% of hydrophobic addition monomers and about 1 to 50% of anionic addition monomers.

17. The fusible print media of claim 16, wherein hydrophobic addition monomers are selected from $C_1$-$C_{12}$ alkyl acrylate, $C_1$-$C_{12}$ alkyl methacrylate, vinyl esters, styrene, styrene derivatives, and combinations thereof.

18. The fusible print media of claim 16, wherein anionic addition monomers include monomers containing anionic functional group, are selected from sulfonic acid, sulfuric acid, phosphoric acid, carboxylic acid, sulfinic acid, and combinations thereof.

* * * * *

UNITED STATES PATENT AND TRADEMARK OFFICE
CERTIFICATE OF CORRECTION

PATENT NO. : 7,559,643 B2 Page 1 of 1
APPLICATION NO. : 10/925664
DATED : July 14, 2009
INVENTOR(S) : Tienteh Chen et al.

It is certified that error appears in the above-identified patent and that said Letters Patent is hereby corrected as shown below:

In column 11, line 52, in Claim 6, delete "salts of" before "trialkylaminopropylacrylamides".

In column 12, line 40, in Claim 15, delete "salts of" before "trialkylaminopropylacrylamides".

Signed and Sealed this

Twenty-ninth Day of June, 2010

David J. Kappos
*Director of the United States Patent and Trademark Office*